United States Patent
Lei et al.

(10) Patent No.: US 8,712,053 B2
(45) Date of Patent: Apr. 29, 2014

(54) METHOD AND SYSTEM FOR SECURITY AUTHENTICATION OF RADIO FREQUENCY IDENTIFICATION

(75) Inventors: Bo Lei, Shenzhen (CN); Weijie Leng, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/377,700

(22) PCT Filed: Jun. 18, 2010

(86) PCT No.: PCT/CN2010/074092
§ 371 (c)(1),
(2), (4) Date: Dec. 12, 2011

(87) PCT Pub. No.: WO2010/148996
PCT Pub. Date: Dec. 29, 2010

(65) Prior Publication Data
US 2012/0224693 A1    Sep. 6, 2012

(30) Foreign Application Priority Data

Nov. 30, 2009  (CN) .......................... 2009 1 0205981

(51) Int. Cl.
*H04K 1/00*            (2006.01)
(52) U.S. Cl.
USPC ........... 380/270; 380/268; 380/277; 380/278; 713/168; 713/171; 713/185
(58) Field of Classification Search
USPC ....................................................... 380/270
See application file for complete search history.

(56) References Cited

U.S. PATENT DOCUMENTS

| | | | |
|---|---|---|---|
| 8,265,282 B2 * | 9/2012 | Alessio et al. | 380/278 |
| 8,416,057 B2 * | 4/2013 | Bauchot et al. | 340/5.8 |
| 2003/0159036 A1 * | 8/2003 | Walmsley et al. | 713/168 |
| 2007/0106897 A1 * | 5/2007 | Kulakowski | 713/171 |

(Continued)

FOREIGN PATENT DOCUMENTS

| CN | 1932835 A | 3/2007 |
|---|---|---|
| CN | 101271534 A | 9/2008 |
| CN | 101322141 A | 12/2008 |

OTHER PUBLICATIONS

English translation of International Search Report for PCT/CN2010/074092.

*Primary Examiner* — Kambiz Zand
*Assistant Examiner* — Yonas Bayou
(74) *Attorney, Agent, or Firm* — McClure, Qualey & Rodack, LLP

(57) ABSTRACT

A method and system for security authentication of radio frequency identification are disclosed. All the security control in this method is completed by the security authentication control apparatus. The reader is for the command transmission and the tag data forwarding, and there is not the security authentication control logic, the security authentication and the non security authentication can be supported at the same time. The key in the tag is unreadable, which ensures that the tag is unable to be replicated; the constant for every security authentication is randomly generated by the control module, and is returned by the tag after being encrypted, which presents the air interface from intercepting the useful information. This method provides the inventory with the mask code before the security authentication, which can have a certain filtering function on the tag data. The mask code can be configured flexibly.

4 Claims, 2 Drawing Sheets

(56) References Cited

U.S. PATENT DOCUMENTS

| | | | |
|---|---|---|---|
| 2007/0186105 A1* | 8/2007 | Bailey et al. | 713/168 |
| 2008/0100443 A1* | 5/2008 | Grunwald et al. | 340/572.1 |
| 2008/0170695 A1* | 7/2008 | Adler et al. | 380/277 |
| 2008/0199011 A1* | 8/2008 | Tuyls et al. | 380/268 |
| 2009/0045911 A1* | 2/2009 | Bauchot et al. | 340/5.8 |
| 2010/0001840 A1* | 1/2010 | Kang et al. | 340/10.1 |
| 2010/0013638 A1* | 1/2010 | Lee et al. | 340/572.1 |
| 2010/0014673 A1* | 1/2010 | Lee et al. | 380/270 |
| 2010/0017617 A1* | 1/2010 | Lee et al. | 713/185 |

* cited by examiner

METHOD AND SYSTEM FOR SECURITY AUTHENTICATION OF RADIO FREQUENCY IDENTIFICATION

CROSS REFERENCE RELATED APPLICATIONS

This application is a national phase of PCT/CN2010/074092 filed Jun. 18, 2010, which claims priority to China Application Serial No. 200910205981.2, filed Nov. 30, 2009, both of which are entirely incorporated herein by reference.

TECHNICAL FIELD

The present invention relates to the information security technique, and particularly, to a method and system for ensuring the security of reading tag data in a Radio Frequency Identification (RFID) system.

BACKGROUND OF THE RELATED ART

To be a kind of the radio identification technique, RFID is applied in various fields, including the fields such as the entrance guard, work attendance, parking lot, logistics, and traffic and so on. The RFID system is generally composed of the tag, reader and antennae, the reader reads the tag information through the antennae, and the tag information is transmitted to the application system after decoding.

With the high speed development of the RFID technique, the RFID plays a more and more important role in the daily work and life of human beings, however the demands for ensuring the security of collecting the tag data becomes more and more stronger. It is well known that the RFID standards such as the ISO 18000-6B and ISO 18000-6C and so on are open standards, which do not encrypt the inventory and reading of the tag at all. It is required to custom one security authentication scheme so as to satisfy the correctness and security of the tag inventory.

At present, the security authentication of the RFID system is mainly implemented by a plurality of following methods:

method 1, the Unique Identifier (UID) when the tag leaves the factory is used to generate a new cipher by a certain encryption algorithm, and the generated cipher is written into an Electrically Erasable Programmable Read-Only Memory (EEPROM) of the tag, and the security authentication is carried out by this cipher. The drawback of this method is that the valid information can be extracted and analyzed from the air interface information by intercepting the air interface information, thereby replicating the tag, and the tag is easy to be replicated.

Method 2, one special tag is designed, the logic state is irreversible after the tag is converted from the unregistered working state to the registered working state, and its key is unreadable. This method has a higher requirement on the tag hardware, which causes the increase of the tag cost.

Method 3, a key authentication is added between the tag and the reader respectively so as to prevent the air interface from intercepting, the background database stores the tag information at the same time, and the drawback of this method is that the tag information should be sent to the background database for every security authentication, the database returns the result after completing the authentication, and the system efficiency is low and the system real-time is reduced.

The China patent application with the application number being 200610016279.8 discloses "a electronic tag encryption technique", and the technical scheme disclosed by this application has following technical drawbacks: the UID code when the tag leaves the factory is used, and for the current technique, this UID code is still likely to be replicated; the air interface transmission is not encrypted, and the air interface information is easy to be intercepted.

The China patent application with the application number being 200710175850.5 discloses "a method for electronic tag security authentication", and the technical scheme disclosed by this application has following technical drawbacks: the logic state is irreversible after the tag is converted from the unregistered working state to the registered working state, the database is involved into the security authentication, and the real-time is bad; and this method has a higher requirement on the tag hardware, which causes the increase of the tag cost.

The China patent application with the application number being 200810027003.9 discloses "a RFID tag and a reader thereof, and a reading system and a security authentication method", and the technical scheme disclosed by this application has following technical drawbacks: the database is involved into the process of security authentication, and the real-time is bad; the tag inventory is carried out without the mask code, which will possibly inventory a great many invalid tags in the multiple-tag environment, and the security authentication efficiency is reduced; the key can not be configured flexibly, and the system flexibility is not high; and the whole security authentication work is completed and controlled by the reader, the reader design complexity is high, and the reliability of the system is reduced.

SUMMARY OF THE INVENTION

In view of this, the main object of the present invention is to provide a method and system for security authentication of radio frequency identification, which is for solving the drawbacks such as the tag is easy to be replicated, the requirement for the tag hardware is high, and the system real-time is bad and so on existing in the current methods of security authentication of the radio frequency identification system.

In order to achieve the above objects, the technical scheme of the present invention is implemented in this way:

a method for security authentication of radio frequency identification comprises following steps:

a security authentication control apparatus sending an inventory command to a tag via a reader, said tag feeding back an Electronic Product Code (EPC) to said security authentication control apparatus via said reader;

said security authentication control apparatus sending an unencrypted random number to said tag via said reader;

said tag using a locally stored encryption key to carry out an encryption calculation on said unencrypted random number to generate encrypted data, and feeding back said encrypted data to said security authentication control apparatus via said reader; and said security authentication control apparatus carrying out the security authentication on said encrypted data.

Furthermore, the inventory command sent by said security authentication control apparatus via said reader is an inventory command with a mask code; said tag obtains the mask code from said inventory command with the mask code and matches the mask code with a locally stored EPC code, if matching successfully, returns a matched EPC code to said security authentication control apparatus via said reader.

Furthermore, the step of said security authentication control apparatus carrying out the security authentication on said encrypted data comprises:

said security authentication control apparatus using a decryption key paired with said encryption key to decrypt said encrypted data, if a random number obtained after decrypting is equal to said unencrypted random number, then the security authentication succeeding, or else authentication failing.

Furthermore, said security authentication control apparatus authorizes the EPC code fed back by said tag to be used by an upper layer application after said security authentication control apparatus carries out the security authentication on said encrypted data successfully.

Based on the above method, the present invention further provides a system for security authentication of radio frequency identification, and said system comprises:

a tag, which is for storing an EPC code and an encryption key; is further for responding to an inventory command sent via a reader, and feeding back the EPC code to a security authentication control apparatus; and is further for receiving an unencrypted random number sent by the security authentication control apparatus via the reader, and using said encryption key to carry out an encryption calculation on said unencrypted random number to generate encrypted data, and feeding back said encrypted data to said security authentication control apparatus via said reader;

the reader, which is for transmitting a security authentication command, and reading tag data and forwarding the tag data to the security authentication control apparatus; and the security authentication control apparatus, which is for sending the inventory command to said tag via the reader, receiving the EPC code fed back by the tag; and is further for sending the unencrypted random number to said tag via the reader, receiving the encrypted data fed back by the tag, and carrying out the security authentication on said encrypted data.

Said tag further comprises:

an EPC code match module, which is for responding to the inventory command sent by said security authentication control apparatus via said reader, obtaining a mask code from said inventory command with the mask code and matching the mask code with the EPC code stored locally, and if matching successfully, feeding back a matched code to said security authentication control apparatus via said reader; and a random number encryption module, which is for receiving the unencrypted random number sent down by said security authentication control apparatus via said reader, and using said encryption key to encrypt this random number, then feeding back this encrypted random number to said security authentication control apparatus.

Said security authentication control apparatus further comprises:

a code obtaining module, which is for sending an inventory command with a mask code to said tag via said reader; and receiving the EPC code fed back by the tag via said reader;

a random number generation module, which is for randomly generating the unencrypted random number after completing EPC code obtainment, and sending the unencrypted random number to said tag via said reader;

an authentication module, which is for receiving the encrypted data fed back by said tag via said reader, using a decryption key paired with said encryption key to decrypt said encrypted data, and comparing whether the decrypted data are equal to said unencrypted random number, if equal, sending an authentication success command to an authorization module, or sending an authentication failure command to the authorization module.

Furthermore, said security authentication control apparatus further comprises the authorization module which is for deciding whether to send said EPC code to an upper layer application according to an authentication result fed back by the authentication module.

Comparing with the prior art, all the controls of the security authentication in the present invention are completed by the control module, the reader is for the command transmission and the receiving and sending of the tag data, and there is not the security authentication control logic, two systems for the security authentication and the non security authentication can be supported at the same time, and the flexibility of the system is improved. The key in the tag is unreadable, which ensures that the tag is unable to be replicated; the constant for performing the security authentication every time is randomly generated by the control module to send to the tag, and is returned by the tag after encrypting, and the information intercepted by the air interface does not have any reference value. There is no information interaction with the background database in the whole authentication process of the present invention, which enhances the real-time of the system and reduces the complexity of the system.

Besides, the present invention provides the inventory with the mask code before the security authentication, which can have a certain filtering function on the tag data, only the matched EPC code is able to be inventoried and returned, the mask code can be configured flexibly, and thus the flexibility of the system design is improved.

PREFERRED EMBODIMENTS OF THE PRESENT INVENTION

In order to make the objects, technical scheme and advantages of the present invention clearer, below it will further illustrate the present invention in detail with reference to figures.

Figure 1:
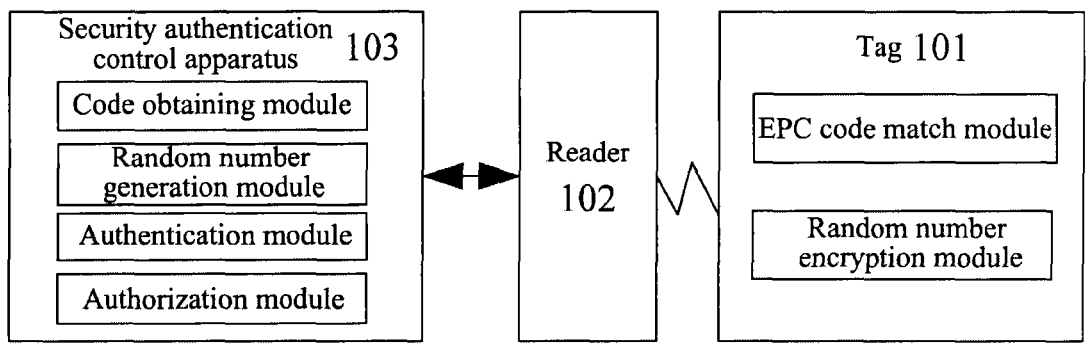
FIG. 1 is a structure schematic diagram of the system for security authentication according to the present invention.

FIG. 1 is a structure schematic diagram of the system for security authentication according to the present invention, and the system comprises a tag 101, a reader 102, and a security authentication control apparatus 103, and functions of each part are:

the tag 101 is for storing the EPC code and the encryption key; is further for responding to the inventory command sent via the reader, and feeding back the EPC code to the security authentication control apparatus; and is further for receiving the unencrypted random number S1 sent by the security authentication control apparatus via the reader, using the encryption key to carry out the encryption operation on the unencrypted random number S1 to generate the encrypted data S2, and feeding back S2 to the security authentication control apparatus via the reader.

The tag further comprises: an EPC code match module and a random number encryption module;

the EPC code match module is for responding to the inventory command sent down by the security authentication control apparatus, and feeding back the EPC code to the security authentication control apparatus; preferably, in the present invention, the inventory command sent by the security authentication control apparatus via the reader is the inventory command with the mask code, the EPC code match module obtains the mask code from the inventory command with the mask code and matches the mask code with the locally stored EPC code, and if the match succeeds, then the matched EPC code is returned to the reader, or else no response is made.

The random number encryption module is for receiving the unencrypted random number S1 sent down by the security authentication control apparatus via the reader, using the locally stored encryption key to encrypt the S1 to generate the random number S2, and feeding back S2 to said security authentication control apparatus;

the reader 102 is for receiving the security authentication command sent by the security authentication control apparatus, converting the security authentication command into the tag control command and transmitting the tag control command to the tag through the radio frequency module, and receiving the data returned by the tag and transmitting the data returned by the tag to the security authentication control apparatus.

The security authentication control apparatus 103 is for carrying out the security authentication of the tag, and sending the security authentication command and carrying out authentication processing on the data fed back by the tag, for example, including initiating the inventory command, sending the random number, receiving the EPC, receiving the encrypted random number and authenticating it;

the security authentication control apparatus sends the inventory command with the mask code to the reader according to the configured mask code, and the mask code can be matched, and the security authentication control apparatus receives the EPC code returned by the reader; generates the random number S1 to send to the reader, receives the encrypted data S2 returned by the reader, and carries out the decryption operation on the S2 to obtain the result S3 according to the configured key, and if S1=S3, then the security authentication is passed.

The security authentication control apparatus further comprises following modules:

a code obtaining module, which is for sending the inventory command with the mask code to the tag via the reader; and receiving the EPC code fed back by the tag via the reader;

a random number generation module, which is for randomly generating the unencrypted random number S1 after completing EPC code obtainment, and sending the unencrypted random number S1 to the tag via the reader;

an authentication module, which is for receiving the encryption data S2 fed back by the tag via the reader, using the decryption key paired with said encryption key to decrypt the encrypted data S2, comparing whether the decrypted data S2 are equal to the unencrypted random number S1, and if yes, sending the authentication success command to the authorization module, or else sending the authentication failure command to the authorization module;

the authorization module, which is for deciding whether to send the EPC code to be used by the upper layer application according to the authentication result fed back by the authentication module, if the authentication of the authorization module succeeds, then authorizing the upper layer application to use the EPC code, or else refusing providing the EPC code to the upper layer application.

The encryption key for encrypting the S1 data in the tag and the decryption key for decrypting the S2 data in the security authentication control apparatus are a group of paired keys, and can be generated by use of the equivalent encryption algorithm or the asymmetrical encryption algorithm and are distributed to the tag and the security authentication control apparatus.

Figure 2:
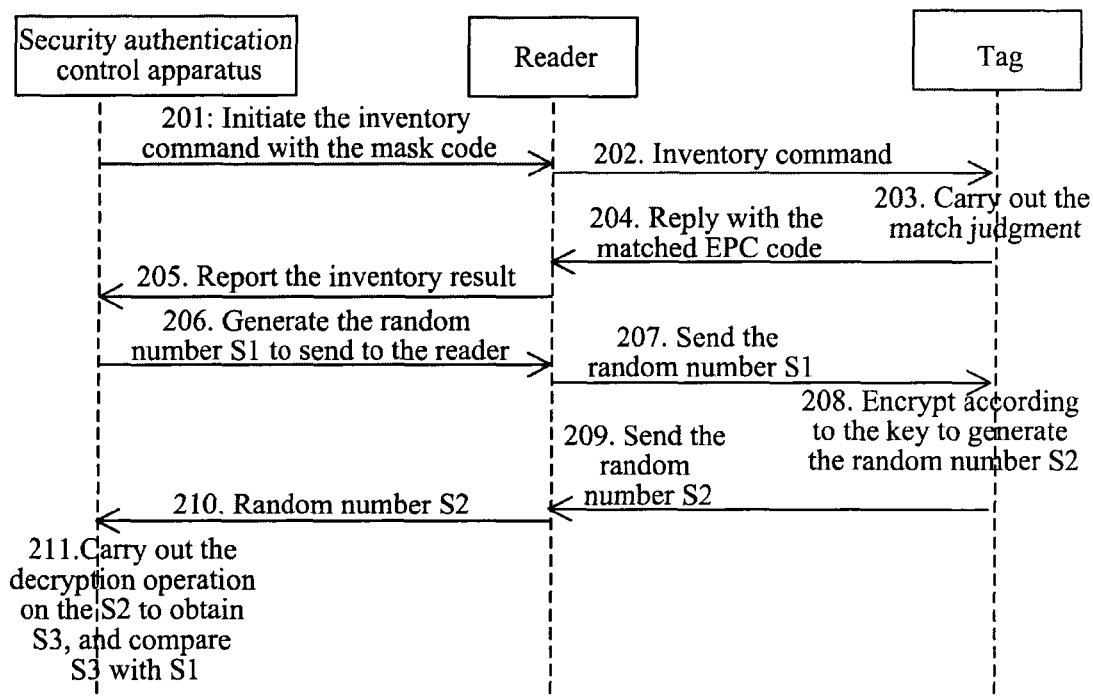
FIG. 2 is a schematic diagram of the flow for controlling the security authentication according to the present invention.

FIG. 2 is a schematic diagram of the flow for controlling the security authentication according to the present invention, and the particular steps are:

step 201, the security authentication control apparatus uses the configured mask code to send the inventory command with the mask code to the reader;

step 202, the reader receives the inventory command with the mask code, and converts the inventory command with the mask code into the radio frequency signal to send to the tag;

step 203, the tag receives the inventory command with the mask code, and obtains the mask code from the inventory command with the mask code to match with the local EPC code, and if the match succeeds, then step 204 is carried out, or else, no information is returned, and the flow ends;

step 204, the tag replies the matched EPC code to the reader;

step 205, the reader encapsulates the fed back EPC code to form the inventory result based on the interface defined by the reader and the security authentication control apparatus according to the EPC code fed back by the tag, and then reports the inventory result to the security authentication control apparatus;

step 206, the security authentication control apparatus generates the random number S1 to send to the reader;

step 207, the reader forwards the random number S1 to the tag;

step 208, the tag uses the encryption key in the storage area to carry out the encryption calculation on the random data S2 to generate the encrypted data S2;

step 209, the tag sends the encrypted data S2 to the reader;

step 210, the reader forwards encrypted data S2 to the security authentication control apparatus;

step 211, the security authentication control apparatus carries out the decryption operation on the S2 according to the configured decryption key to generate the S3, the security authentication control apparatus compares the S3 and S1, if the S3 and S1 are the same, then the security authentication is passed, and the security authentication control apparatus sends the tag information to other modules.

The inventory command in the present invention is the inventory with the mask code, which is able to carry out certain filtering on the EPC code on the tag and reduce the fed back data amount; the reader does not process the security authentication, which reduces the development difficulty of the reader; and the security authentication control apparatus can be added into the control device or the background server, which improves the system flexibility.

Figure 3:
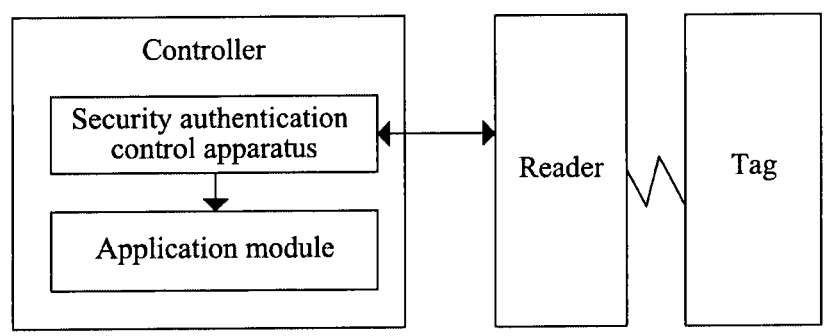
FIG. 3 is an application example of the system for security authentication of the radio frequency identification according to the present invention.

FIG. 3 is an application example of the present invention, in this example, said security authentication control apparatus is located at the controller, the controller further includes one or more upper layer application modules, and the security authentication control apparatus transmits the EPC code returned by the tag to the application module to be used by the application module after completing the security authentication of the tag.

The above description is only preferable examples of the present invention, and is not for limiting the protection scope of the present invention.

What is claimed is:

1. A method for security authentication of radio frequency identification, comprising:

a security authentication control apparatus sending an inventory command to a tag via a reader, said tag feeding back an Electronic Product Code (EPC) to said security authentication control apparatus via said reader;

said security authentication control apparatus randomly generating an unencrypted random number and sending said unencrypted random number to said tag via said reader;

said tag directly using a locally stored encryption key to carry out an encryption calculation directly on said unencrypted random number randomly generated by and received from said security authentication control apparatus to generate encrypted data, and feeding back said encrypted data to said security authentication control apparatus via said reader; and said security authentication control apparatus carrying out the security authentication on said encrypted data;

wherein, the inventory command sent by said security authentication control apparatus via said reader is an inventory command with a mask code; said tag obtains the mask code from said inventory command with the mask code and performs matching on a locally stored EPC code, if matching successfully, returns a matched EPC code to said security authentication control apparatus via said reader; and wherein said security authentication control apparatus authorizes the EPC code fed back by said tag to be used by an upper layer application after said security authentication control apparatus carries out the security authentication on said encrypted data successfully.

2. The method as claimed in claim 1, wherein the step of said security authentication control apparatus carrying out the security authentication on said encrypted data comprises:

said security authentication control apparatus using a decryption key paired with said encryption key to decrypt said encrypted data, if a random number obtained after decrypting is equal to said unencrypted random number, then the security authentication succeeding, or else the authentication failing.

3. A system for security authentication of radio frequency identification, comprising:

a tag, which is for storing an EPC code and an encryption key; is further for responding to an inventory command sent via a reader, and feeding back the EPC code to a security authentication control apparatus; and is further for receiving an unencrypted random number randomly generated by the security authentication control apparatus and sent by the security authentication control apparatus via the reader, and directly using said encryption key to carry out an encryption calculation directly on said unencrypted random number randomly generated by and received from said security authentication control apparatus to generate encrypted data, and feeding back said encrypted data to said security authentication control apparatus via said reader;

the reader, which is for transmitting a security authentication command, and reading tag data and forwarding the tag data to the security authentication control apparatus; and the security authentication control apparatus, which is for sending the inventory command to said tag via the reader, receiving the EPC code fed back by the tag; and is further for randomly generating the unencrypted random number and sending the unencrypted random number to said tag via the reader, receiving the encrypted data fed back by the tag, and carrying out the security authentication on said encrypted data;

wherein said security authentication control apparatus comprises:

a code obtaining module, which is for sending an inventory command with a mask code to said tag via said reader; and receiving the EPC code fed back by the tag via said reader;

a random number generation module, which is for randomly generating the unencrypted random number after completing to obtain the EPC code, and sending the unencrypted random number to said tag via said reader; and an authentication module, which is for receiving the encrypted data fed back by said tag via said reader, using a decryption key paired with said encryption key to decrypt said encrypted data, and comparing whether the decrypted data are equal to said unencrypted random number, if equal, sending an authentication success command to an authorization module, or else sending an authentication failure command to the authorization module; and wherein said security authentication control apparatus further comprises the authorization module which is for deciding whether to send said EPC code to an upper layer application according to an authentication result fed back by the authentication module.

4. The system as claimed in claim 3, wherein said tag comprises:

an EPC code match module, which is for responding to the inventory command sent by said security authentication control apparatus via said reader, obtaining a mask code from said inventory command with the mask code and performing matching on a locally stored EPC code, and if the matching is successful, feeding back a matched code to said security authentication control apparatus via said reader; and a random number encryption module, which is for receiving the unencrypted random number sent down by said security authentication control apparatus via said reader, using said encryption key to encrypt this random number, then feeding back the encrypted random number to said security authentication control apparatus.

* * * * *